(12) United States Patent
Joo et al.

(10) Patent No.: US 8,081,279 B2
(45) Date of Patent: Dec. 20, 2011

(54) LIQUID CRYSTAL DISPLAY APPARATUS

(75) Inventors: Sun-Kyu Joo, Seoul (KR); Myung-Sub Lee, Suwon-si (KR); Yun-Seok Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 75 days.

(21) Appl. No.: 11/805,911

(22) Filed: May 25, 2007

(65) Prior Publication Data
US 2008/0002129 A1    Jan. 3, 2008

(30) Foreign Application Priority Data
May 26, 2006  (KR) .................. 2006-47646

(51) Int. Cl.
*G02F 1/1339*    (2006.01)
(52) U.S. Cl. .................................................... 349/116
(58) Field of Classification Search .......... 349/155–156
See application file for complete search history.

(56) References Cited

U.S. PATENT DOCUMENTS
2002/0093615 A1* 7/2002 Mun et al. ............... 349/143
2005/0068482 A1* 3/2005 Kume et al. ............. 349/130
2005/0259210 A1* 11/2005 Lee et al. ................. 349/156

FOREIGN PATENT DOCUMENTS
JP    2005-189476    7/2005
JP    2005-242353    9/2005
KR    10-2005-0112063    11/2005

OTHER PUBLICATIONS

Patent Abstracts of Japan, Publication No. 2005-189476, Jul. 14, 2005, 1 p.
Patent Abstracts of Japan, Publication No. 2005-242353, Sep. 8, 2005, 1 p.
Korean Patent Abstracts, Publication No. 1020050112063, Nov. 29, 2005, 1 p.

* cited by examiner

*Primary Examiner* — Jerry Rahll
(74) *Attorney, Agent, or Firm* — Innovation Counsel LLP

(57) ABSTRACT

Disclosed is a liquid crystal display device including a first substrate where pixel areas are defined, a second substrate facing the first substrate, liquid crystals aligned between the first and second substrates, and spacers that maintain a gap between the first and second substrates. The pixel areas are divided into a plurality of domains along the alignment direction of the liquid crystals by way of domain dividers. Optical characteristics are compensated in different domains, so that the viewing angle of the liquid crystal display device is increased. The display quality of the liquid crystal display device is improved by adjusting the shape and position of the domain dividers and the spacers.

18 Claims, 10 Drawing Sheets

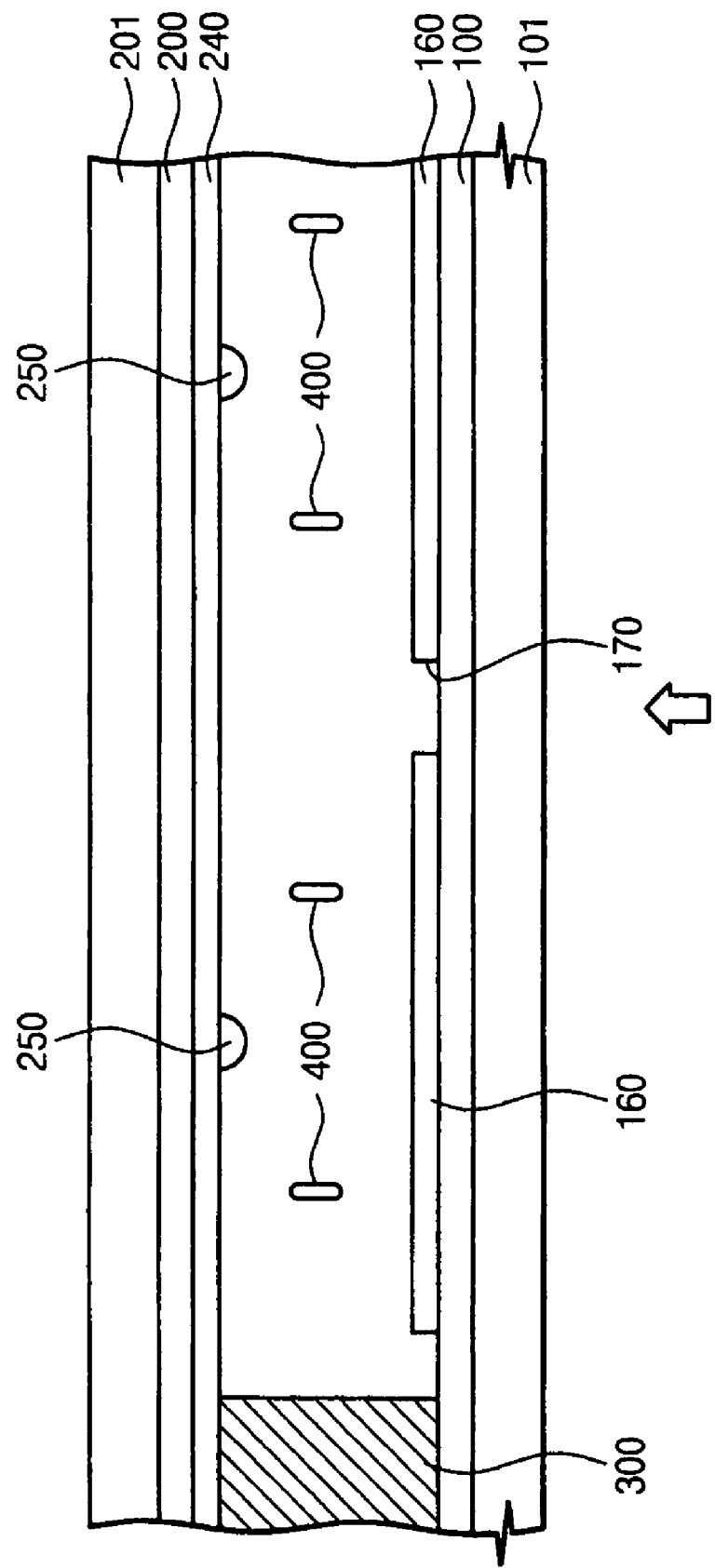

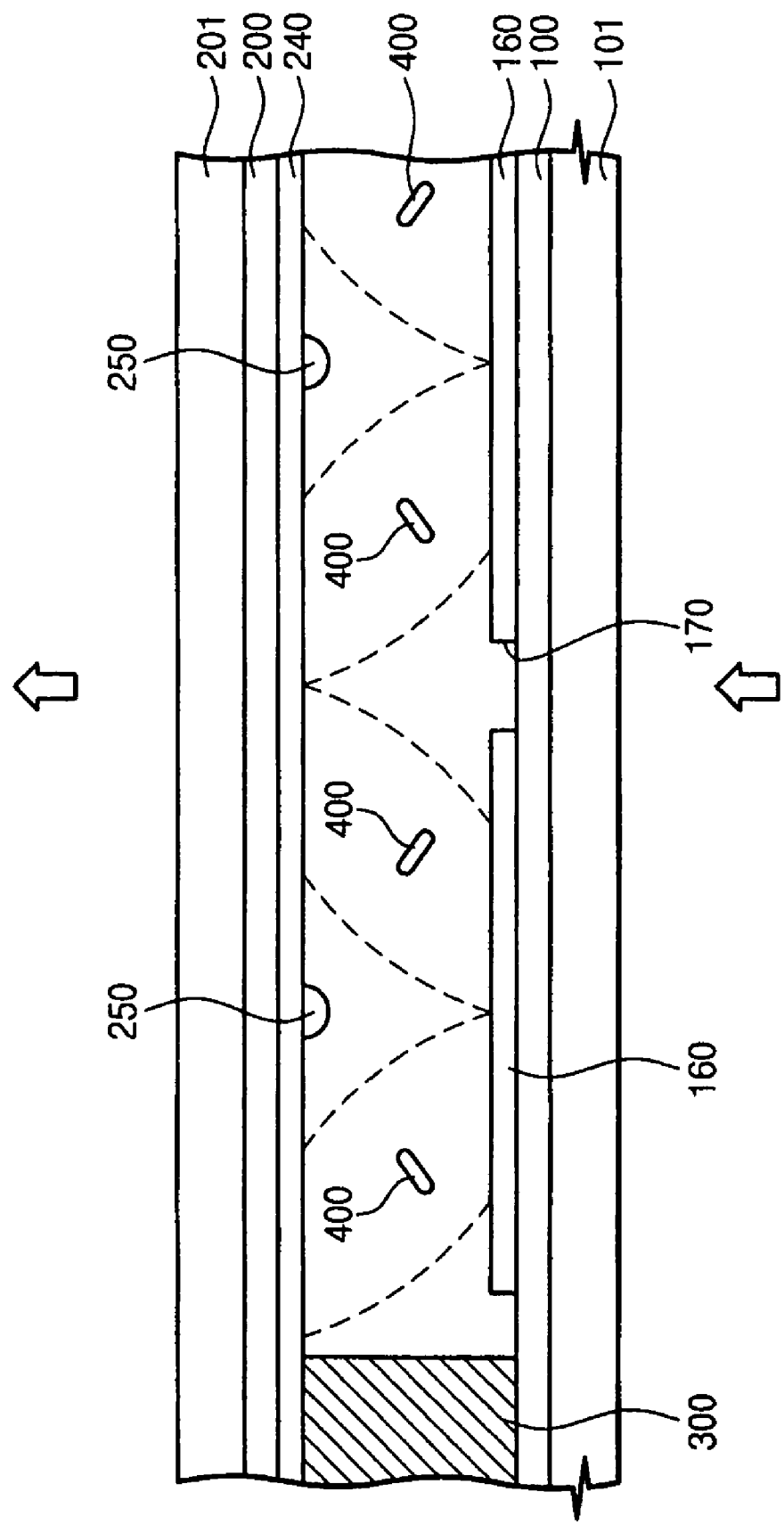

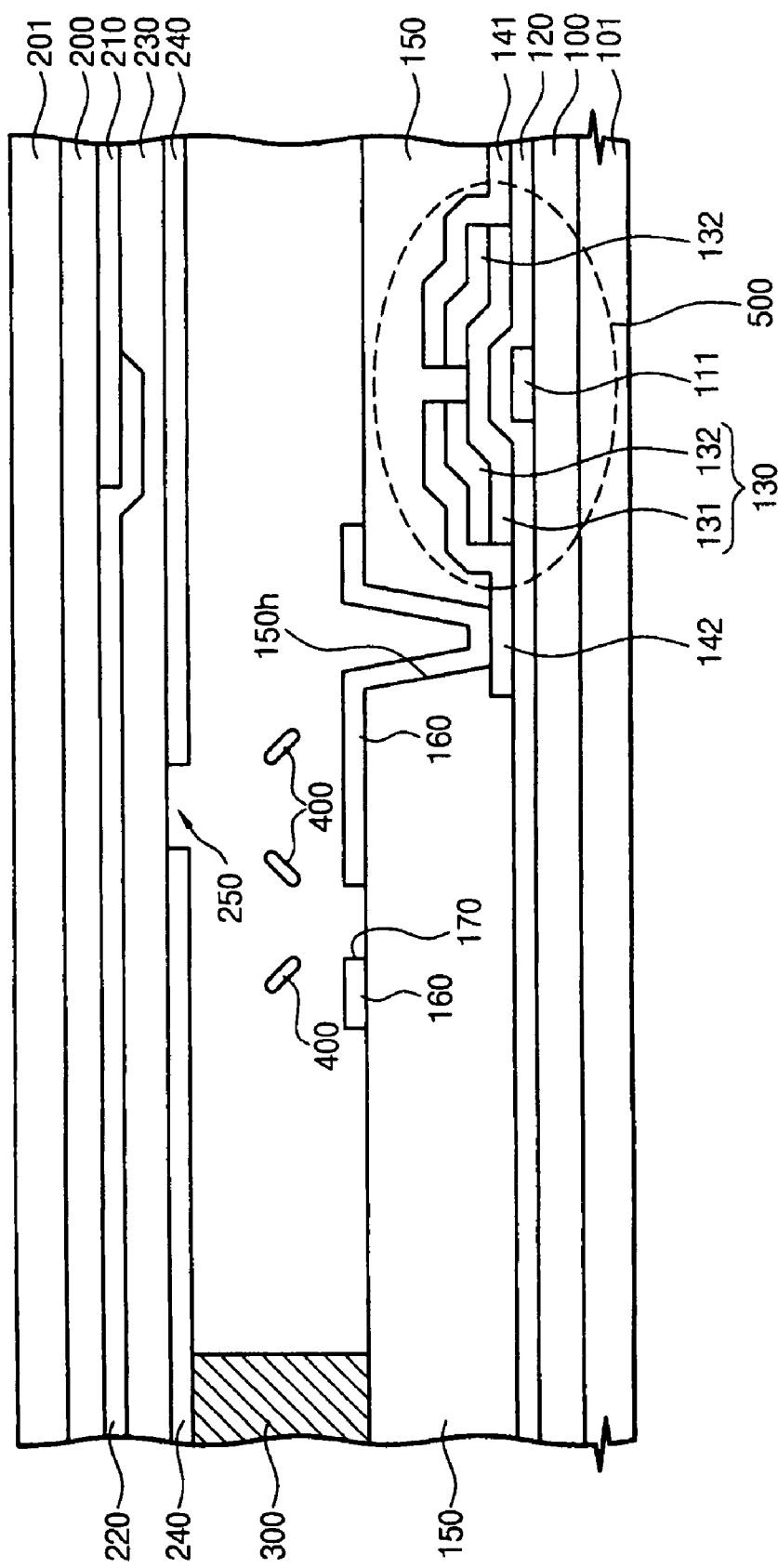

LIQUID CRYSTAL DISPLAY APPARATUS

CROSS-REFERENCE TO RELATED APPLICATION

This application relies for priority upon Korean Patent Application No. 2006-47646 filed on May 26, 2006, the contents of which are herein incorporated by reference in its entirety.

BACKGROUND OF THE INVENTION

1. Field of the Invention

The present invention relates to a display apparatus. More particularly, the present invention relates to a liquid crystal display apparatus.

2. Description of the Related Art

A liquid crystal display apparatus uses liquid crystals having the mesomorphic phase representing both liquid and crystal properties. The liquid crystal display apparatus has two substrates, and the liquid crystals are aligned between the two substrates. Since the liquid crystals have dielectric anisotropy and refractive index anisotropy, the alignment of the liquid crystals is changed when an electric field is applied to the liquid crystals and light transmittance of the liquid crystal display apparatus varies according to the alignment state of the liquid crystals. The liquid crystal display apparatus applies an electric field to the liquid crystals such that the liquid crystals represent light transmittance corresponding to display information, and then properly aligns the liquid crystals according to the electric field, thereby enabling image display.

Due to the refractive index anisotropy, the liquid crystal display device produces a viewing angle narrower than that of other display devices. A term "viewing angle" refers to a range of an angle allowing a user to properly view a displayed image. The image displayed in the LCD device is seen as a distorted image when a person views the image from a lateral side of the LCD device, so that the person does not properly view the image displayed in the LCD device.

Recently, various attempts have been performed to increase the viewing angle of the liquid crystal display device, but these attempts cause other problems, such as lowering the quality of the image displayed in the LCD device.

SUMMARY OF THE INVENTION

The present invention provides a liquid crystal display device capable of increasing a viewing angle while improving display quality thereof.

In one aspect of the present invention, a liquid crystal display device includes a first substrate, a second substrate, liquid crystals, a pixel electrode, a common electrode, a first domain divider and spacers. The first substrate has pixel areas, each pixel area divided into a plurality of domains. The second substrate faces the first substrate. The liquid crystals are aligned between the first and second substrates. The pixel electrode is formed in each pixel area on the first substrate. The common electrode is formed on the second substrate. The first domain divider is formed in the pixel electrode and divides the each pixel area into the plurality of domains. The spacers are formed on the first substrate or the second substrate to maintain a gap between the first and second substrates. At least one spacer is positioned adjacent to a longitudinal end portion of at least one domain divider in each corresponding pixel area.

A second domain divider is formed on the second substrate.

The first domain divider includes a cut-out section obtained by removing a predetermined portion of the pixel electrode or a protrusion formed on a predetermined area of the pixel electrode. The second domain divider includes a cut-out section obtained by removing a predetermined portion of the common electrode, or a protrusion formed on a predetermined area of the common electrode. Gate lines and data lines are formed on the first substrate. At least one spacer is aligned on each gate line at one edge portion of the each pixel area. At least a portion of the spacer overlaps with the gate line and the data line.

In another aspect of the present invention, a liquid crystal display device includes a first substrate, a second substrate, liquid crystals, a pixel electrode, a common electrode, a domain divider, and a spacer. The first substrate has a pixel area. The second substrate faces the first substrate. The liquid crystals are aligned between the first and second substrates. The pixel electrode is formed in the pixel area on the first substrate. The common electrode is formed on the second substrate. The domain divider is formed in the pixel electrode and divide the pixel area into a plurality of domains. The spacer is formed on the first substrate and the second substrate and maintains a gap between the first and second substrates, the spacer positioned on a line parallel to a virtual line which extends lengthwise along at least one domain divider from an end portion of the at least one domain divider.

BRIEF DESCRIPTION OF THE DRAWINGS

The above and other advantages of the present invention will become readily apparent by reference to the following detailed description when considered in conjunction with the accompanying drawings wherein:

FIG. 4A is a sectional view, representing the black state in the operational state of a liquid crystal display device according to another exemplary embodiment, taken along line I-I' shown in FIG. 1;

FIG. 4B is a sectional view, representing the black state in the operational state of a liquid crystal display device according to another exemplary embodiment, taken along line I-I' shown in FIG. 1;

FIG. 8 is a sectional view taken along line III-III' shown in FIG. 7.

DESCRIPTION OF THE EMBODIMENTS

Figure 1:
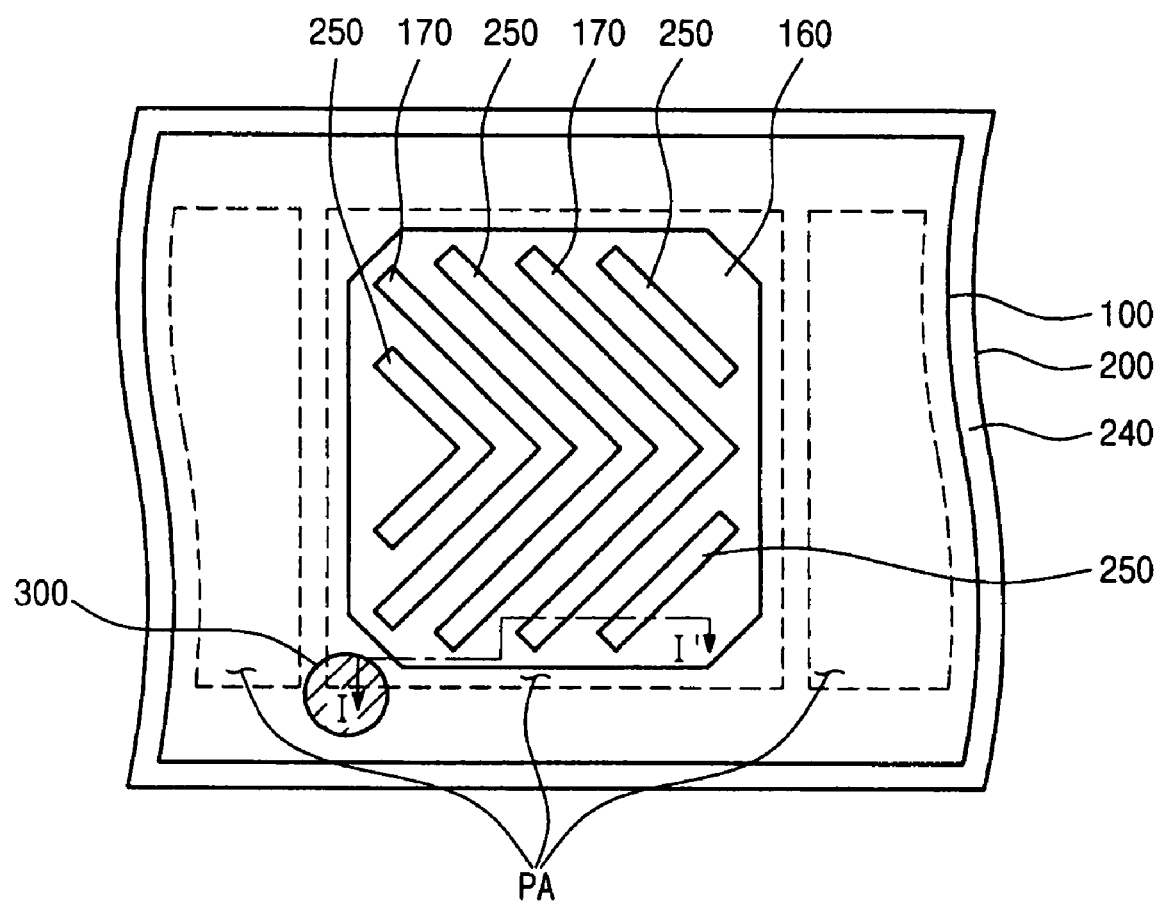
FIG. 1 is a plan view illustrating a liquid crystal display device according to an exemplary embodiment.

Hereinafter, embodiments of the present invention will be explained in detail with reference to the accompanying drawings. However, the scope of the present invention is not limited to such embodiments and the present invention may be realized in various forms. The embodiments to be described below are provided to assist those skilled in the art to understand the present invention. The present invention is defined only by the scope of the appended claims. In addition, the size of layers and regions shown in the drawings may be simplified or magnified for the purpose of clear explanation. Also, the same reference numerals are used to designate the same elements throughout the drawings.

FIG. 1 is a plan view illustrating a liquid crystal display device according to an exemplary embodiment.

Referring to FIG. 1, the liquid crystal display device includes a first substrate 100 and a second substrate 200. Pixel areas PA are defined on the first substrate 100. The pixel area PA is a basic area that represents the image, and a plurality of pixel areas PA having the same structure are repeatedly defined on the first substrate 100. Since all pixel areas PA have the same structure, hereinafter, the structure of a predetermined single pixel area will be explained as a representative example.

The second substrate 200 is coupled with the first substrate 100 while facing the first substrate 100. A liquid crystal layer is interposed between the first and second substrates 100 and 200. The liquid crystals are aligned in different directions on each pixel area PA, and the pixel area PA is divided into a plurality of domains according to the preferred alignment direction of the liquid crystals. A pixel electrode 160 and a common electrode 240 are formed on the first and second substrates 100 and 200, respectively. First and second domain dividers 170 and 250 are provided in the pixel electrode 160 and the common electrode 240, respectively. The first and second domain dividers 170 and 250 may interact with each other such that the pixel area PA can be divided into the plurality of domains.

A spacer 300 is provided at the edge portion of the pixel area PA. The spacer 300 maintains the gap between the first substrate 100 and the second substrate 200 within a predetermined distance. Although the spacer 300 can be provided on any of the first substrate 100 and the second substrate 200, the spacer 300 is preferably provided on the second substrate 200 in view of economy. If an error occurs in the process of forming the spacer 300, a substrate having the spacer 300 must be discarded. At this time, since the first substrate 100 is more expensive than the second substrate 200, it is more economical and preferred to discard the second substrate 200 when an error occurs in forming the spacer 300 on the second substrate 200.

Figure 2A:
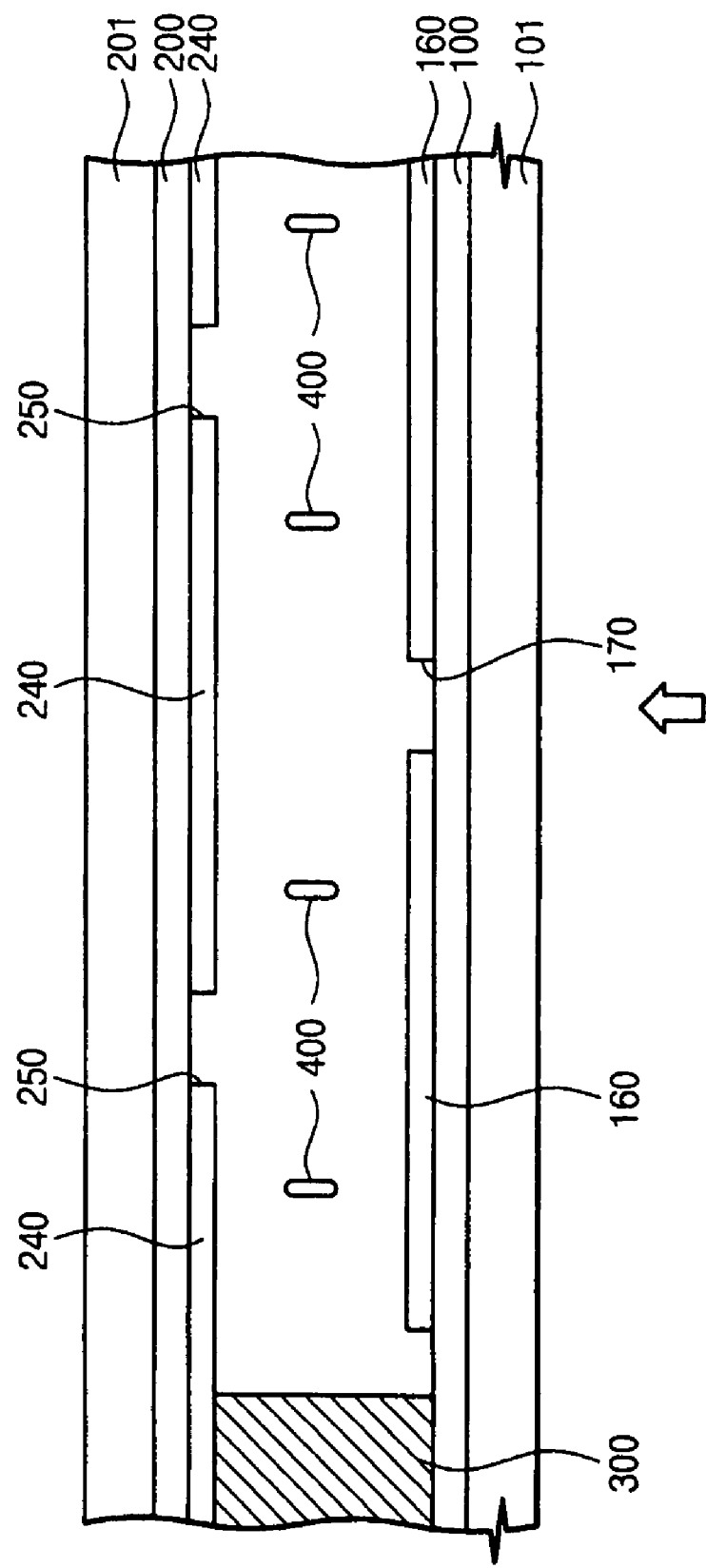
FIG. 2A is a sectional view, representing the black state in the operational state of a liquid crystal display device, taken along line I-I' shown in FIG. 1.

FIG. 2A is a sectional view, representing the black state in the operational state of a liquid crystal display device, taken along line I-I' shown in FIG. 1.

Referring to FIG. 2A, first and second polarizing plates 101 and 201 are attached to outer portions of the first and second substrates 100 and 200. The first and second polarizing plates 101 and 201 each have a respective transmission axis which allows light having the electric field component parallel to the transmission axis to pass therethrough. The transmission axis of the first polarizing plate 101 is aligned perpendicular to the transmission axis of the second polarizing plate 102. The pixel electrode and the common electrode 240 are provided at inner facing surfaces of the first and second substrates 100 and 200, respectively.

The pixel electrode 160 is provided with the first domain divider 170. The first domain divider 170 is a cut-out section obtained by removing a predetermined portion of the pixel electrode 160. The common electrode 240 is provided with the second domain divider 250. The second domain divider 250 is a cut-out section obtained by removing a predetermined portion of the common electrode 240. The first and second domain dividers 170 and 250 are offset from each other such that the first domain divider 170 does not overlap with the second domain divider 250. The spacer 300 is formed on the common electrode 240, in which the spacer 300 has a predetermined height and makes contact with the pixel electrode 160 of the first substrate 100.

A space is formed between the first and second substrates 100 and 200 corresponding to the height of the spacer 300, and the liquid crystals 400 are aligned in the space. The liquid crystals 400 have an oval shape including a long axis and a short axis. The alignment direction of the liquid crystals 400 is defined as the long-axis direction. The liquid crystals 400 have vertical alignment characteristics, so the liquid crystals 400 are aligned normal to both substrates 100 and 200 in the area adjacent to the pixel electrode 160 and the common electrode 240. However, the alignment direction of the liquid crystals 400 provided in the vicinity of the spacer 300 is not normal to the first and second substrates 100 and 200 due to the spacer 300.

During the operation of the liquid crystal display device, light is provided from beneath a portion of the first substrate 100 as indicated by an arrow. The light is linearly polarized parallel to the transmission axis of the first polarizing plate 101 while passing through the first polarizing plate 101. The linearly polarized light reaches the second polarizing plate 201 by way of the first substrate 100, the liquid crystals 400, and the second substrate 200. If the linearly polarized light passes through the liquid crystals 400 in a state in which the liquid crystals 400 are aligned vertically to the first and second substrates 100 and 200, phase variation of the light does not occur. The second polarizing plate 201 is aligned perpendicularly to the transmission axis of the polarizing plate 101, so that the linearly polarized light that reaches the second polarizing plate 201 is completely absorbed. In this case, the image is not displayed, and the liquid crystal display device exhibits a black state.

Figure 2B:
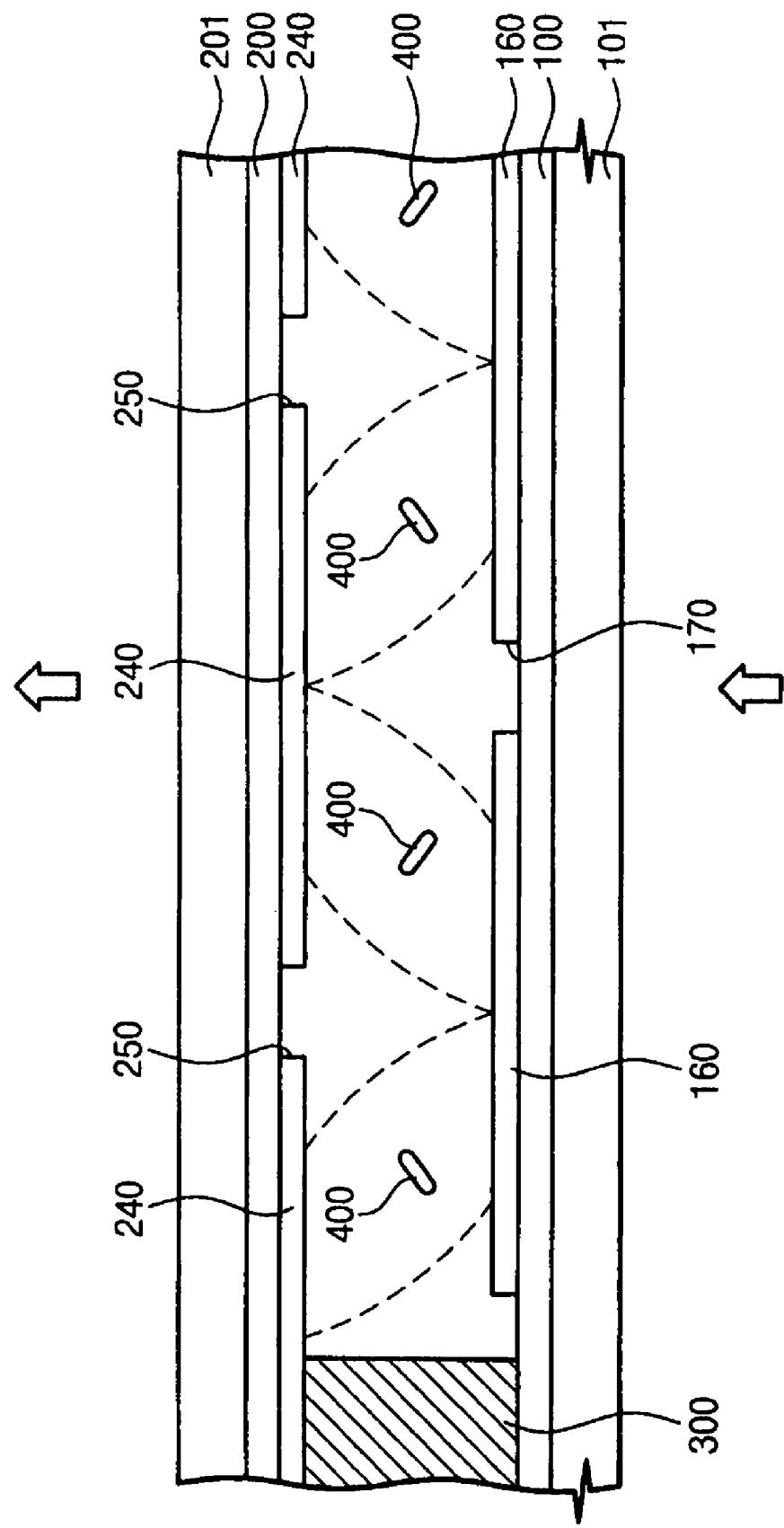
FIG. 2B is a sectional view, representing the white state in the operational state of a liquid crystal display device, taken along line I-I' shown in FIG. 1.

FIG. 2B is a sectional view, representing the white state in the operational state of a liquid crystal display device, taken along line I-I' shown in FIG. 1.

Referring to FIG. 2B, different voltages are applied to the common electrode 240 and the pixel electrode 160, respectively. That is, a constant common voltage is applied to the common electrode 240 and a data voltage corresponding to the image to be displayed is applied to the pixel electrode 160. At this time, an electric field is formed between the common electrode 240 and the pixel electrode 160 due to the potential difference between the common voltage and the data voltage. The electric field is applied to the liquid crystals 400. Although the electric field is formed in the direction normal to the common electrode 240 and the pixel electrode 160, the direction of the electric field is changed in the areas where the first and second domain dividers 170 and 250 are formed with cut-out sections. That is, since the common electrode 240 and the pixel electrode 160 are removed in the above areas, the voltage is not applied to the areas of the first and second domain dividers 170 and 250.

Accordingly, the electric field is formed along a curved line (shown in a dotted line) extending from a predetermined area of the pixel electrode 160, which is adjacent to the first domain divider 170, to a predetermined portion of the common electrode 240, which is adjacent to the second domain divider 250. Thus, the alignment of the liquid crystals 400 is changed according to the electric field.

If the alignment of the liquid crystals 400 is changed due to the electric field, the phase of the light that has been linearly polarized while passing through the first polarizing plate 101 may be changed as the light passes through the liquid crystals 400. Accordingly, the phase-shifted light may pass through the second polarizing plate 201 having the transmission axis perpendicular to the first polarizing plate 101, so that the image is displayed. When the electric field is maximized, the liquid crystal display device exhibits a white state having a maximum brightness.

The liquid crystals 400 have negative dielectric anisotropy so that the liquid crystals 400 are aligned while being tilted perpendicularly to the direction of the electrical field. The direction of the electric field is changed at both sides of the first and second domain dividers 170 and 250. As a result, the alignment of the liquid crystals 400 is discontinuously changed about the cut-out sections of the first and second domain dividers 170 and 250. The term "domain" signifies a single area where the alignment of the liquid crystals 400 is continuously changed when electric field is applied thereto. Thus, both sides of the first and second domain dividers 170 and 250 are distinguished from each other. The pixel area PA is divided into a plurality of domains due to the interaction between the first and second domain dividers 170 and 250.

In adjacent domains, the liquid crystals 400 are aligned in different directions. Thus, the optical characteristics of the adjacent domains are compensated for each other, so that the viewing angle of the liquid crystal display device can be improved. Meanwhile, a compensation film can be provided between the first substrate 100 and the first polarizing plate 101 and/or between the second substrate 200 and the second polarizing plate 201. Such a compensation film can further widen the viewing angle of the liquid crystal display device.

In the following description, the alignment of the liquid crystals 400 when an electric field is apply is explained in detail.

Figure 3A:
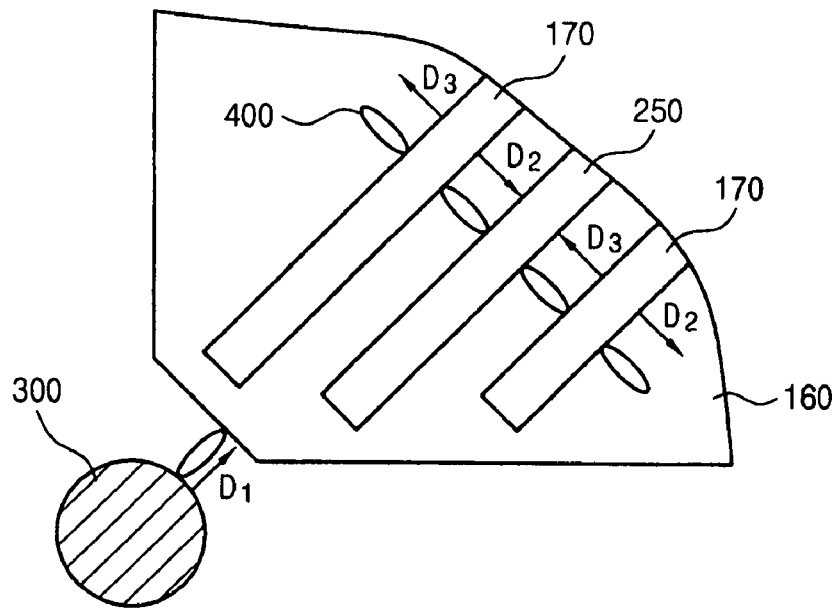
FIG. 3A is a partial plan view representing the white state in the operational state of a liquid crystal display device according to an exemplary embodiment.

FIG. 3A is a partial plan view representing the white state in the operational state of a liquid crystal display device according to an exemplary embodiment Referring to FIG. 3A, the liquid crystals 400 provided in the vicinity of the spacer 300 are aligned in a first direction D1 when an electric field is applied thereto. In addition, the liquid crystals 400 provided at both sides of the first and second domain dividers 170 and 250 are aligned in a second direction D2 and a third direction D3, respectively. The directions of the electric field formed at both sides of the first and second domain dividers 170 and 250 are symmetrical to each other. Accordingly, the second direction D2 and third direction D3, which are alignment directions of the liquid crystals 400, are also symmetrical to each other. When viewed in a plan view, the second direction D2 and the third direction D3 appear identical to each other. However, when taking the tilting direction relative to the pixel electrode 160 into consideration, the second and third directions D2 and D3 are symmetrical to each other (see, FIG. 2B).

The spacer 300 is positioned apart from the pixel electrode 160 by a predetermined distance. Since the pixel electrode 160 is not formed in the vicinity of the spacer 300 between the spacer 300 and the pixel electrode 160, a relatively weak electric field is applied to the area between the spacer 300 and the pixel electrode 160 compared to the area having the pixel electrode 160 in the white state subject to the electric field. Accordingly, in the white state, the liquid crystals 400 provided between the spacer 300 and the pixel electrode 160 are aligned in the first direction D1, which is different from the alignment direction in the area having the pixel electrode 160.

In this case, the first to third directions D1 to D3 are determined according to the shape and the position of the first and second domain dividers 170 and 250 and spacer 300.

As shown in the plan view of FIG. 3A, the second and third direction D2 and D3 are perpendicular to the longitudinal direction of the first and second domain dividers 170 and 250. The spacer 300 is positioned to cross virtual lines extending in the direction from end portions of the first and second domain dividers 170 and 250 and parallel to the longitudinal axis of the first and second domain dividers 170 and 250. As the size of the cut-out section forming the first and second domain dividers 170 and 250 is changed, the number of virtual lines extending from the cut-out sections, which cross the spacer 300, may increase or decrease. Otherwise, the spacer may not cross the virtual lines and be positioned between two neighboring virtual lines extending from the first and second domain dividers 170 and 250 if the distance between the two neighboring virtual lines is large.

In this case, the liquid crystal 400 is relatively parallel to the virtual line(s) in the area adjacent to the spacer 300 due to the spacer 300. When viewed in a plan view, the liquid crystal 400 is aligned in the first direction D1 which is perpendicular to the second and third directions D2 and D3. The first direction D1 can be changed according to the shape of the spacer 300. For instance, if the spacer 300 is formed with a cylindrical shape having a circular section, the first direction D1 is normal to the surface of the circular section. In this case, although the liquid crystals 400 adjacent to the spacer 300 is not aligned in one direction, most of the liquid crystals 400 are not aligned correspondingly to any of the second and third directions D2 and D3. As result, a deterioration of an image displayed due to the misalignment of the liquid crystals 400 is prevented.

Figure 3B:
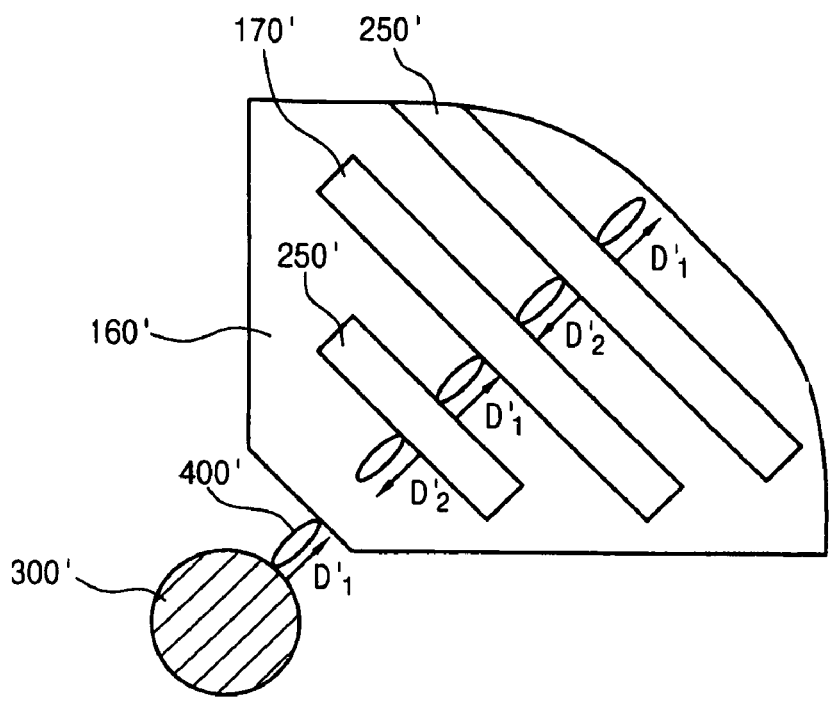
FIG. 3B is a partial plan view representing the white state in the operational state of a liquid crystal display device according to a another embodiment.

FIG. 3B is a partial plan view, representing the white state in the operational state of a liquid crystal display device, according to a another embodiment.

Referring to FIG. 3B, a pixel electrode 160' and first and second domain dividers 170' and 250' are provided, and a spacer 300' is formed apart from the pixel electrode 160'. In the white state subject to the electric field, liquid crystals 400' are aligned in first and second directions D1' and D2' perpendicularly to the longitudinal axis direction of the first and second domain dividers 170' and 250'. In addition, the spacer 300' is positioned on the virtual line extending perpendicularly to the longitudinal axis direction of the first and second domain dividers 170' and 250'.

When an electric field is applied to the liquid crystal display device, the liquid crystals 400' are aligned in the second direction D2' at the edge portion of the pixel electrode 160' adjacent to the spacer 300', and the liquid crystals 400' are aligned in the first direction D1' in the area between the pixel electrode 160' and the spacer 300'. In this case, the boundary between the first and second directions D1' and D2' is the edge portion of the pixel electrode 160'. The liquid crystals 400' in this boundary area can be aligned randomly because the liquid crystals 400' in the corresponding area are affected by the first direction D1' and the second direction D2' symmetrical to each other. As result, the quality of the image displayed in the liquid crystal display may be deteriorated. Particularly, when displaying the color image by combining red, green and blue colors, the brightness of blue color may be reduced, and the brightness of red and green colors may be increased, exhibiting yellow spots.

FIGS. 4A and 4B are sectional views taken along line I-I' shown in FIG. 1, representing the operational state of a liquid crystal display device according to another exemplary embodiment. In the following description, details of parts identical to those of the previous embodiment will be omitted in order to avoid redundancy.

Referring to FIG. 4A, the liquid crystal display device includes first and second substrates 100 and 200, first and second polarizing plates 101 and 201 attached to outer portions of the first and second substrates 100 and 200, pixel and common electrodes 160 and 240 attached to inner portions of the first and second substrates 100 and 200. Liquid crystals 400 are aligned between the first and second substrates 100 and 200 normal to both substrates 100 and 200.

The pixel electrode 160 is provided with a first domain divider 170, which is a cut-out section obtained by removing a predetermined area of the pixel electrode 160. In addition, the common electrode 240 is provided with a second domain divider 250, which is a protrusion extending from the common electrode 240 such that the protrusion does not overlap with the cut-out section in the longitudinal direction.

The protrusion includes an insulating material so that the direction of the electric field is changed in the vicinity of the protrusion. The protrusion has a function identical to that of the cut-out section, and the alignment of the liquid crystals 400 is changed about the protrusion so that the domains are distinguished from each other.

The first domain divider 170 may include a protrusion instead of the cut-out section. In this case, although the cut-out section can be formed simultaneously with the pixel electrode 160 through the patterning process, an additional process is necessary to form the protrusion in the pixel electrode 160. Thus, the manufacturing steps can be reduced when the cut-out section, rather than the protrusion, is formed in the pixel electrode 160.

Referring to FIG. 4B, when different voltages are applied to the pixel electrode 160 and the common electrode 240, respectively, an electric field is applied to the liquid crystals 400, so the alignment of the liquid crystals 400 is changed. Thus, the phase of the light that has been linearly polarized while passing through the first polarizing plate 101 is changed. Accordingly, the phase-changed light may pass through the second polarizing plate 201, so that the image is displayed. In addition, the pixel area PA is divided into a plurality of domains due to the interaction between the protrusion and the cut-out section, so that the optical characteristic of each domain can be improved, thereby increasing the viewing angle of the liquid crystal display device.

As shown in FIG. 1, the spacer 300 is positioned so as to cross the virtual line extending in the longitudinal axis direction from the portion of the first and second domain dividers 170 and 250 regardless of the cut-out section or the protrusion of the first or second domain divider 170 and 250. As a result, the quality of the image displayed is improved.

In this manner, the present invention can be applied to liquid crystal display devices provided with a distinguishing structure, such as the protrusion or the cut-out section that distinguishes domains from each other. In the following description, two exemplary embodiments of the liquid crystal display devices provided with the structure distinguishing the domains are explained in detail.

Figure 5:
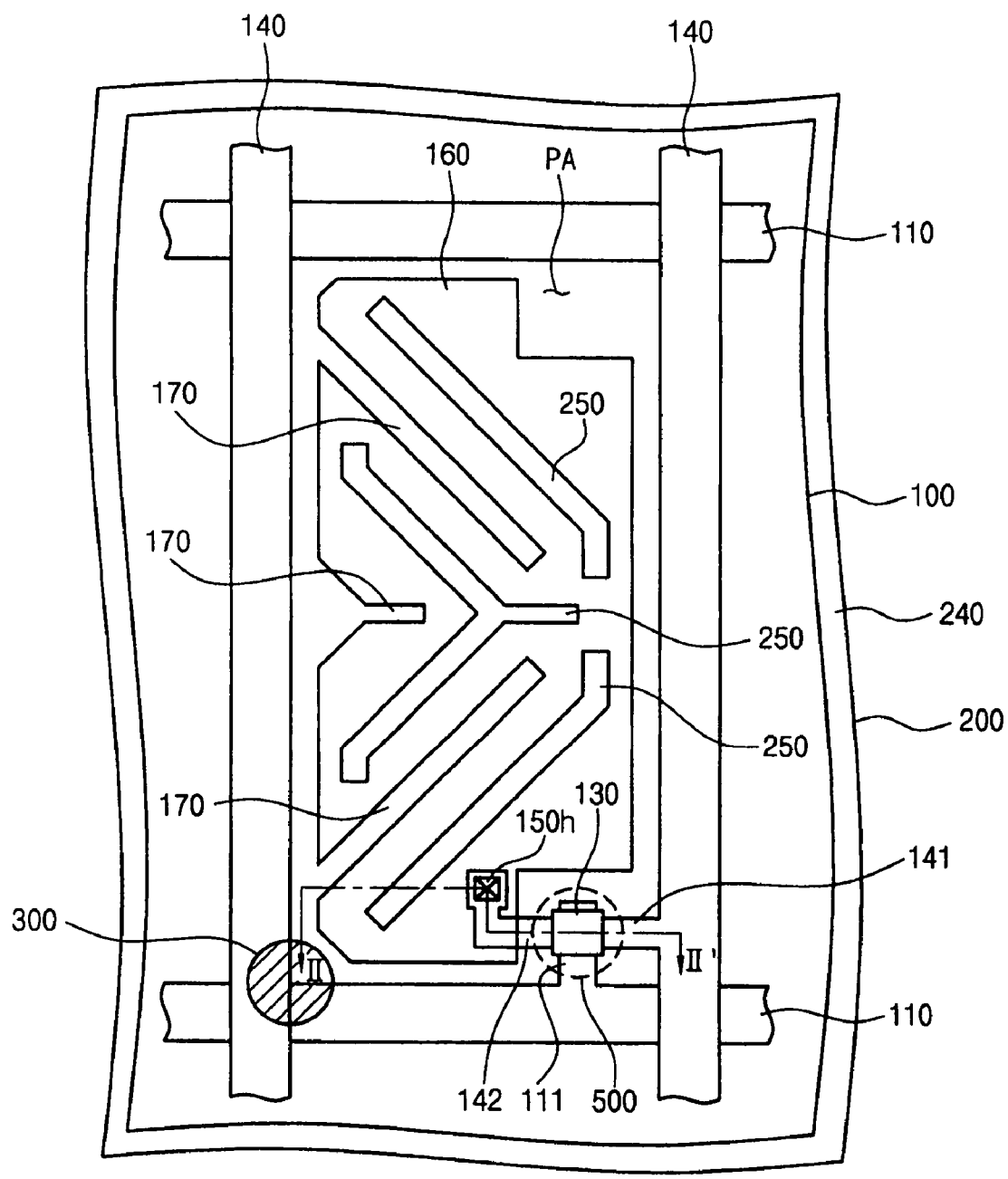
FIG. 5 is a plan view illustrating a liquid crystal display device according to another exemplary embodiment.
Figure 6:
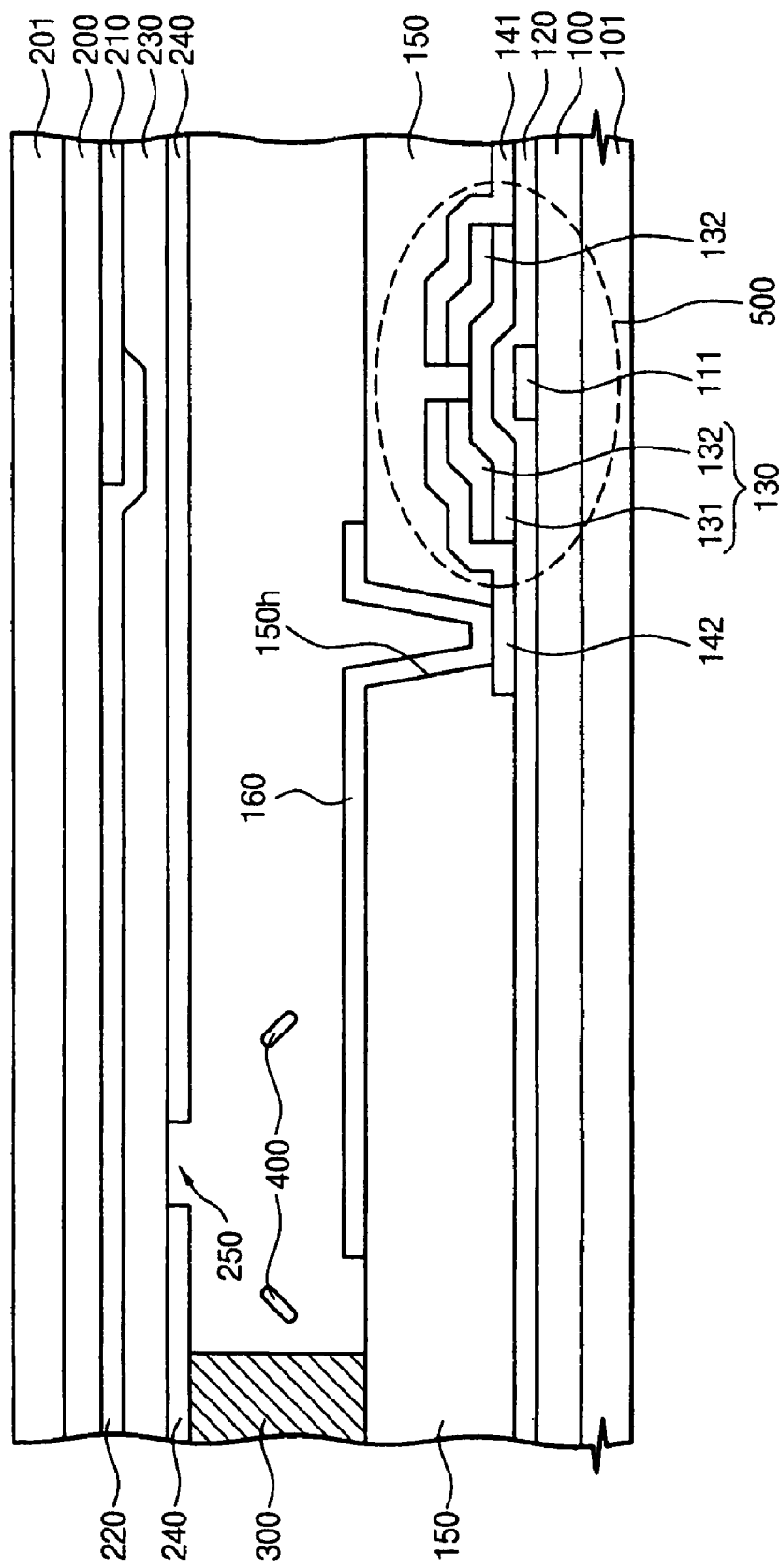
FIG. 6 is a sectional view taken along line II-II' shown in FIG. 5.

FIG. 5 is a plan view illustrating a liquid crystal display device according to another exemplary embodiment of the present invention, and FIG. 6 is a sectional view taken along line II-II' shown in FIG. 5.

Referring to FIGS. 5 and 6, the liquid crystal display device includes first substrate 100 and second substrate 200 that face each other. Liquid crystals 400 are aligned between the first and second substrates 100 and 200. The first and second polarizing plates 101 and 201 are attached to outer portions of the first and second substrates 100 and 200. A plurality of gate lines 110 and data lines 140, which extend in different directions, are formed on the first substrate 100. The gate lines 110 extend perpendicularly to the data lines 140. For instance, the gate lines 110 extend in the row direction and the data lines 140 extend in the column direction while crossing each other, thereby defining pixel areas PA therebeteween. The pixel areas PA are repeatedly formed with the same structure. The detailed structure of one pixel area PA is as follows.

The pixel electrode 160 is formed on the pixel area PA of the first substrate 100 and is provided with a first domain divider 170, which is a cut-out section obtained by removing a predetermined portion of the pixel electrode 160. The first domain divider 170 includes tilting portions which are tilted relative to the gate lines 110 (or data lines 140) and the tilt angle of the tilting parts is preferably 45° or 135°.

A thin film transistor 500 is provided at an edge of the pixel area PA. The thin film transistor 500 includes a gate electrode 111 branching from the gate line 110, a source electrode 141 branching from the data lines 140, and a drain electrode 142 electrically connected to the pixel electrode 160 while being spaced apart from the source electrode 141.

Common electrode 240 is formed on the second substrate 200. The common electrode 240 is provided with second domain divider 250, which is a cut-out section obtained by removing a predetermined portion of the common electrode 240. The second domain divider 250 includes tilting portions which are tilted relative to the gate lines 110 (or the data lines 140) and the tilting portions of the second domain divider 250 are parallel to the tilting portions of the first domain divider 170. When viewed in a plan view, the tilting portions of the first and second domain dividers 170 and 250 are offset from each other without overlapping with each other. The spacer 300 is formed on the second substrate 200. The spacer 300 is positioned on the other edge portion of the pixel area PA, rather than the edge portion where the thin film transistor 500 is formed.

During the operation of the liquid crystal display device, a gate-on signal is transmitted along the gate lines 110 so that the thin film transistor 500 is turned on. In addition, a data signal is transmitted along the data lines 140 so that the data voltage is applied to the pixel electrode 160. At the same time, the common voltage is applied to the common electrode 240, so that the electric field is formed between the common electrode 240 and the pixel electrode 160. Accordingly, the alignment of the liquid crystals 400 is changed, so that the image is displayed on the liquid crystal display device.

Due to the electric field, the liquid crystals 400 are aligned symmetrically to each other about the first and second domain dividers 170 and 250. In the area adjacent to the spacer 300, the liquid crystals 400 are aligned in the direction substantially perpendicular to the symmetrical alignment of the liquid crystals 400 when viewed in a plan view. As a result, similarly to the previous embodiments, the quality of the image displayed on the liquid crystal display device can be improved at the boundary area between the area adjacent to the spacer 300 and the pixel electrode 160.

The tilting portions of the first and second domain dividers 170 and 250 are symmetrically arranged about a virtual line which extends parallel to the gate line 110 while dividing the pixel area PA into two equal portions, e.g. an "upper" and a "lower" portion, as viewed in FIG. 5. Thus, the liquid crystals 400 provided in the vicinity of the tilting portions are aligned in different directions at both sides of the first and second domain dividers 170 and 250 on the basis of the first and second domain dividers 170 and 250 positioned above or below the virtual line. As a result, the liquid crystals 400 provided in the vicinity of the tilting portions may lose directionality, so that the liquid crystals 400 are randomly aligned without being aligned in a specific direction. In this case, the operational speed of the liquid crystal display device may be degraded due to the liquid crystals 400 which are randomly aligned.

In order to prevent the liquid crystals 400 from being randomly aligned when the liquid crystals are positioned in the middle area where the liquid crystals are urged to be aligned in different directions, the first and second domain dividers 170 and 250 further include portions formed in parallel to the gate lines 110, i.e., parallel to the virtual line and the data lines 140. The portions formed parallel to the gate lines 110 or the data lines 140 may prevent the liquid crystals from becoming randomly aligned in the vicinity of the tilting parts or at the edge portion of the pixel area PA.

As shown in FIG. 6, the gate electrode 111 is formed on a predetermined portion of the first substrate 100. The gate electrode 111 is prepared in the form of a single layer or a multi-layer including a metal, such as chrome (Cr), aluminum (Al), or molybdenum (Mo), or a metal alloy. A gate insulating layer 120, including silicon nitride, is formed on the gate electrode 111 such that the gate insulating layer 120 can cover the entire surface of the first substrate 100.

A semiconductor pattern 130 is formed on the gate insulating layer 120 in such a manner that the semiconductor pattern 130 overlaps with the gate electrode 111. The semiconductor pattern 130 includes amorphous silicon materials and has a dual layer structure including an active pattern 131 and an ohmic contact pattern 132 formed on the active pattern 131. The active pattern 131 is a single structure, but the ohmic contact pattern 132 is divided into two parts and doped with impurity ions.

The source electrode 141 and the drain electrode 142 are formed on the semiconductor pattern 130. The source electrode 141 is spaced apart from the drain electrode 142 while facing the drain electrode 142. Similar to the gate electrode 111, the source electrode 141 and the drain electrode 142 are prepared in the form of a single layer or a multi-layer including a metal, such as chrome (Cr), aluminum (Al), or molybdenum (Mo), or a metal alloy. A protective layer 150 including silicon nitride is formed on the source electrode 141 and the drain electrode 142. The protective layer 150 covers the entire surface of the first substrate 100. The protective layer 150 is formed with a contact hole 150h through which an upper portion of the drain electrode 142 is exposed.

The pixel electrode 160 is formed on the protective layer 150. The pixel electrode 160 is inserted into the contact hole 150h such that the pixel electrode 160 can be electrically connected with the drain electrode 142. The pixel electrode 160 can be obtained by depositing and patterning a transparent conductive layer including indium zinc oxide or indium tin oxide. A predetermined portion of the pixel electrode 160 is removed to form the first domain divider 170.

A light shielding pattern 210 is formed on the second substrate 200. The light shielding pattern 210 is positioned corresponding to a boundary of the pixel areas PA. An opening section is formed corresponding to the pixel areas PA. The light passes through the opening section to display the image, but the light is blocked at the boundary of the pixel areas PA by means of the light shielding pattern 210.

A color filter 220 is formed in the opening section. The color filter 220 filters light components that represent specific colors in the white light. The color filter 220 includes a red filter, a green filter and a blue filter, which are regularly aligned in each pixel area PA. Images having various colors can be displayed by combining red, green and blue colors generated from the red filter, the green filter and the blue filter, respectively. The color filter 220 is formed in the opening section corresponding to the pixel area PA and is partially formed on the light shielding pattern 210. The light shielding pattern 210 may serve as a boundary between different colors.

An overcoat layer 230 is formed on the color filter 220. The overcoat layer 230 is obtained by coating a transparent insulating layer on the color filter 220 and planarizing the surface of the second substrate 200 when the surface of the second substrate 200 is irregularly formed due to the color filter 220 and the light shielding pattern 210.

The common electrode 240 is formed on the overcoat layer 230. The common electrode 240 includes a material identical to the material forming the pixel electrode 160. The common electrode 240 is formed with the second domain divider 250, which is obtained by removing a predetermined portion of the common electrode 240. The common electrode 240 is subject to the etching process in order to form the second domain divider 250 in the common electrode 240. At this time, the overcoat layer 230 prevents the color filter 220 from being damaged by etchant.

The spacer 300 is formed on the common electrode 240. The spacer 300 makes contact with the surface of the first substrate 100 to maintain the gap between the first substrate 100 and the second substrate 200. The spacer 300 includes an opaque insulating material, so that transmission of the light is blocked in the area in which the spacer 300 is formed. The spacer 300 is preferably formed in the area in which the transmission of the light is blocked, in such a manner that the light-blocking area is not reduced by the spacer 300. Preferably, the spacer 300 is formed in an area where gate lines 110 or data lines 140 are formed or an area where the thin film transistor 500 connected with the gate lines 110 and the data lines 140 is formed.

More preferably, the spacer 300 is formed in the area where the thin film transistor 500 is not formed. In the area where the thin film transistor is formed, the thickness difference of the layer may occur among an area where the gate electrode 111 overlaps with the source electrode 141 and the drain electrode 142, an area where the gate electrode 111 only is formed and an area where the source electrode 141 and the gate electrode 111 are formed, so that the surface of the first substrate 100 is not flat.

If the spacer 300 is positioned while making contact with the thin film transistor 500, since the surface of the spacer 300 is not flat, a predetermined portion of the spacer 300 makes contact with the surface of the first substrate 100, but other portions of the spacer 300 do not make contact with the surface of the first substrate 100. As above, if the surface of the first substrate 100 making contact with the spacer 300 has a step difference, the gap between the first and second substrates 100 and 200 cannot be stably maintained due to the spacer 300. In addition, when the spacer 300 attempts to return to its original position due to the elastic property of the spacer 300 after the spacer 300 deviates from the predetermined position on the thin film transistor 500 by an external impact, the step difference may prevent the spacer 300 from returning to the original position. Further, the area where the thin film transistor 500 is formed is limited to a corner of the pixel area PA, so that a range for selecting a position of the spacer 300 is limited.

Accordingly, the spacer 300 is preferably positioned on the gate lines 110 or the data lines 140 at the corner of the pixel area PA without overlapping with the thin film transistor 500. If the space occupied by the spacer 300 is larger than the width of the gate lines 110 or the data lines 140, the spacer 300 may extend to a portion of the adjacent pixel area PA.

Figure 7:
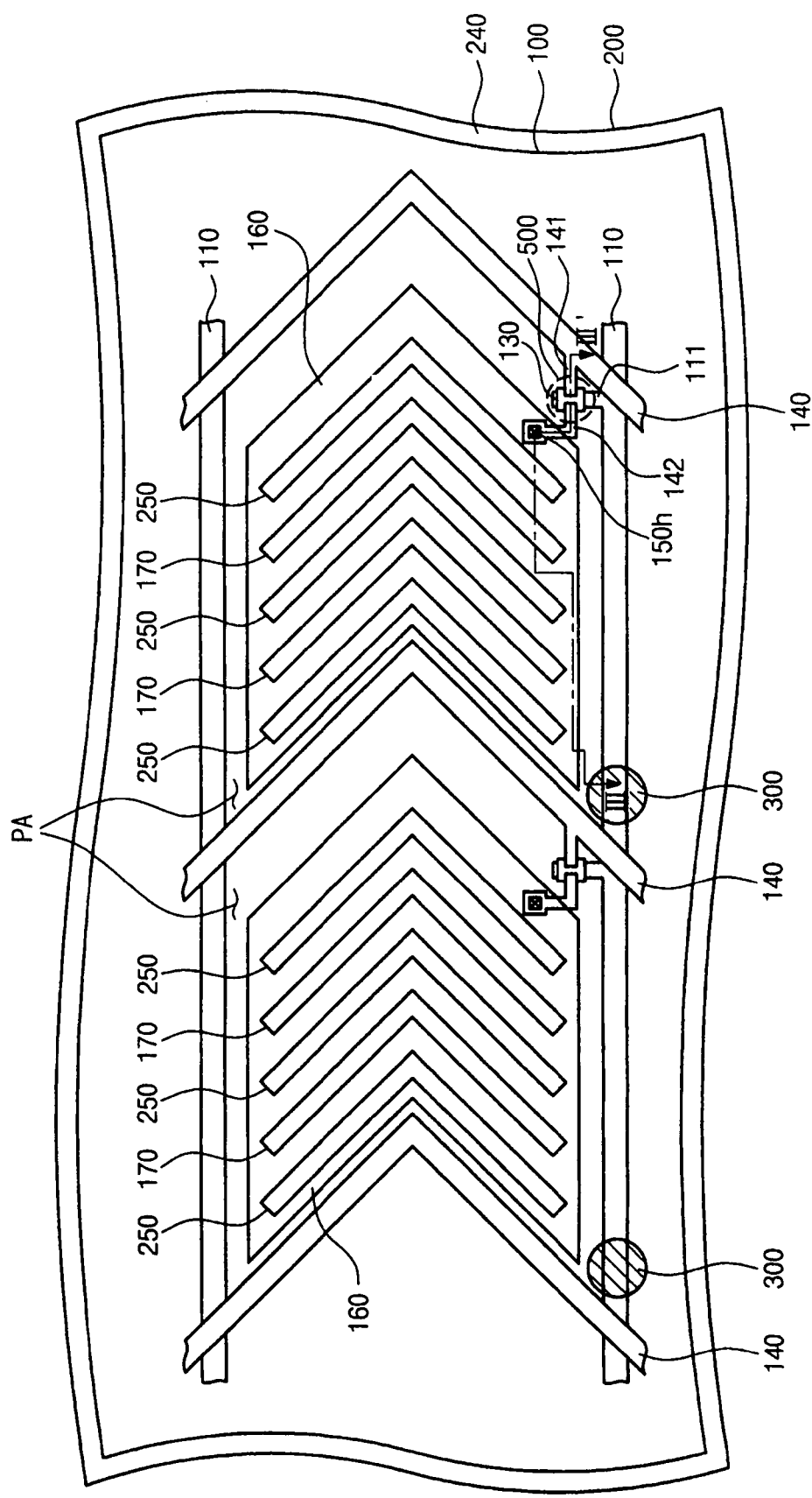
FIG. 7 is a plan view illustrating a liquid crystal display device according to another exemplary embodiment.

FIG. 7 is a plan view illustrating a liquid crystal display device according to another exemplary embodiment, and FIG. 8 is a sectional view taken along line III-III' shown in FIG. 7. In the following description, details of parts identical to those of the previous embodiment will be omitted in order to avoid redundancy.

Referring FIGS. 7 and 8, the liquid crystal display device includes first substrate 100 and second substrate 200 that faces the first substrate 100. Liquid crystals 400 are aligned between the first and second substrates 100 and 200. Gate lines 110 and data lines 140 are formed on the first substrate 100 while crossing each other so as to define pixel areas PA on the first substrate 100. The gate lines 110 extend in one direction and the data lines 140 alternately and slantingly extend in two directions. For instance, the gate lines 110 extend in the row direction and the data lines 140 symmetrically extend in two directions while being inclined relative to the row direction by a predetermined angle. The pixel areas PA are repeatedly formed with the same structure, and the detailed structure of one pixel area PA is as follows.

The pixel electrode 160 is formed on the pixel area PA of the first substrate 100. The pixel electrode 160 has a shape corresponding to the shape of the gate lines 110 and the data lines 140. In detail, the pixel electrode 160 has six edges including edges parallel to the gate lines 110, and edges which are parallel to the data lines 140. The pixel electrode is provided with the first domain divider 170, which is parallel to the data lines 140. A thin film transistor 500 is provided at an edge portion of the pixel area PA in such a manner that gate electrode 111, source electrode 141, and drain electrode 142 of the thin film transistor 500 can be connected to the gate line 110, the data line 140 and the pixel electrode 160, respectively.

Common electrode 240 is formed on the second substrate 200. The common electrode 240 is provided with second domain divider 250, which is a cut-out section obtained by removing a predetermined portion of the common electrode 240. The second domain divider 250 is formed in parallel to first domain divider 170. When viewed in a plan view, the first and second domain dividers 170 and 250 are offset from each other without overlapping with each other. Spacer 300 is formed on the second substrate 200 while making contact with the first substrate 100, so that the spacer 300 maintains the gap between the first and second substrates 200.

Similar to the previous embodiment, the spacer 300 is positioned on a virtual line extending in the direction parallel to the long dimension of the first and second domain dividers 170 and 250. In addition, the spacer 300 is positioned on the edge portion of the pixel area PA except for the area on which the thin film transistor 500 is formed.

During the operation of the liquid crystal display device, the thin film transistor 500 is turned on, and a data signal is transmitted along the data lines 140 so that the data voltage is applied to the pixel electrode 160. At the same time, the common voltage is applied to the common electrode 240, so that the electric field is formed between the common electrode 240 and the pixel electrode 160. Accordingly, the alignment of the liquid crystals 400 is changed, so that the image is displayed on the liquid crystal display device.

At this time, the electric field may be formed between the pixel electrode 160 receiving the data voltage and the data lines 140 to which the data signal is being transmitted, or the electric field may be formed between adjacent pixel electrodes 160 to which different data voltages are applied. Such an electric field is called a "lateral field", which is distinguished from the electric field formed between the common electrode 240 and the pixel electrode 160. The direction of the lateral field is changed depending on the shape of the pixel electrode 160 or the extension direction of the data lines 140.

As shown in FIG. 7, if the edge portion of the pixel electrode 160 is parallel to the extension direction of the data lines 140, the alignment direction of the liquid crystals 400 caused by the lateral field may match with the alignment direction of the liquid crystals 400 caused by the electric field formed between the common electrode 240 and the pixel electrode 160, at the edge portion of the pixel electrode 160. In this case, the liquid crystals 400 aligned in the vicinity of the edge portion of the pixel electrode 160 is subject to the lateral field in addition to the electric field formed between the common electrode 240 and the pixel electrode 160. As a result, the time required to change the black state, in which the liquid crystals 400 are aligned normal to the first and second substrates 100 and 200, into the white state, in which the liquid crystals are aligned while being inclined with respect to the first and second substrates 100 and 200, is shortened, so that the operational speed of the liquid crystal display device can be improved.

The present invention can increase the viewing angle of the liquid crystal display device by aligning the liquid crystals in various directions. In addition, the present invention can improve the display quality of the liquid crystal display device by providing a device for aligning the liquid crystals in various directions and adjusting the shape and position of the spacer. Thus, transmittance of the liquid crystal display device can be improved.

Although the exemplary embodiments have been described, it is understood that the present invention should not be limited to these exemplary embodiments but various changes and modifications can be made by one of ordinary skilled in the art within the spirit and scope of the present invention as hereinafter claimed.

What is claimed is:

1. A liquid crystal display device comprising:
   a first substrate having pixel areas, wherein each pixel area is divided into a plurality of domains;
   a second substrate facing the first substrate;
   liquid crystals aligned between the first and second substrates;
   a pixel electrode formed in each pixel area on the first substrate;
   a common electrode formed on the second substrate and forming an electric field with the pixel electrode to control an alignment of the liquid crystals;
   a plurality of first domain dividers formed in the pixel electrode to divide each pixel area into the plurality of domains;
   a plurality of second domain dividers formed in the common electrode to change the alignment of the liquid crystals together with the first domain dividers; and
   spacers formed on the first substrate or the second substrate in correspondence with the pixel areas to maintain a gap between the first and second substrates, at least one spacer being positioned adjacent to a longitudinal end-portion of at least one of the first domain dividers in each corresponding pixel area,
   wherein the liquid crystals in an area corresponding to an area where the pixel electrode is formed are aligned in a direction perpendicular to a longitudinal direction of the first domain dividers under the electric field in a plan view, and
   wherein the liquid crystals in an area other than the area where the pixel electrode is formed and adjacent to the spacers are aligned in a direction perpendicular or parallel to the longitudinal direction in a plan view.

2. The liquid crystal display device of claim 1, wherein the at least one spacer is positioned on a line parallel to a virtual line extending lengthwise along the first domain dividers from the longitudinal end portion.

3. The liquid crystal display device of claim 1, wherein the first domain dividers comprise a cut-out obtained by removing a predetermined portion of the pixel electrode and a protrusion formed on a predetermined area of the pixel electrode.

4. The liquid crystal display device of claim 1, wherein the first domain dividers are obtained by removing a predetermined portion of the pixel electrode, and the second domain dividers are obtained by removing a predetermined portion of the common electrode.

5. The liquid crystal display device of claim 1, wherein the first domain dividers are obtained by removing a predetermined portion of the pixel electrode, and the second domain dividers are a protrusion formed on the common electrode.

6. The liquid crystal display device of claim 1, further comprising gate lines and data lines formed on the first substrate.

7. The liquid crystal display device of claim 6, wherein the spacers are positioned on corresponding gate lines in corresponding pixel areas.

8. The liquid crystal display device of claim 6, further comprising a thin film transistor formed in the each pixel area, wherein the thin film transistor includes a gate electrode branching from a corresponding gate line, a source electrode branching from a corresponding data line, and a drain electrode being spaced from the source electrode and electrically connected to the pixel electrode.

9. The liquid crystal display device of claim 8, wherein the thin film transistor and the spacers are positioned at different edge portions in the corresponding pixel area.

10. The liquid crystal display device of claim 8, wherein at least a portion of the spacers overlaps with the gate line and the data line.

11. The liquid crystal display device of claim 6, wherein a part of the first domain dividers includes a first tilting portion, which is tilted relative to the gate lines and the data lines by a predetermined angle, and a part of the second domain dividers includes a second tilting portion, which is spaced apart from the first tilting portion parallel to the first tilting portion.

12. The liquid crystal display device of claim 11, wherein the first and second tilting portions are symmetrical to a virtual line that is parallel to the gate lines and divides the pixel areas into two equal portions.

13. The liquid crystal display device of claim 11, wherein at least one of the first and second domain dividers further comprises a portion which is parallel to the gate lines or the data lines.

14. The liquid crystal display device of claim 11, wherein, the liquid crystals are aligned in a first direction at an area adjacent to the spacers when an electric field is applied to the liquid crystals, and are aligned in second and third directions, which are different from the first direction and symmetrical to each other, at both sides of the domain dividers.

15. The liquid crystal display device of claim 14, wherein the first direction is parallel to a long dimension of the first and second tilting portions.

16. The liquid crystal display device of claim 14, wherein the first direction is perpendicular to the second and third directions.

17. A liquid crystal display device comprising:
a first substrate having a pixel area;
a second substrate facing the first substrate;
liquid crystals aligned between the first and second substrates;
a pixel electrode formed in the pixel area on the first substrate;
a common electrode formed on the second substrate and forming an electric field with the pixel electrode to control an alignment of the liquid crystals;
a first domain divider formed in the pixel electrode to divide the pixel area into a plurality of domains;
a second domain divider formed in the common electrode to change the alignment of the liquid crystals together with the first domain divider; and
a spacer formed on the first substrate or the second substrate to maintain a gap between the first and second substrates, the spacer positioned on a line parallel to a virtual line which extends lengthwise along the first domain divider from an end-portion of the first domain divider,
wherein the liquid crystals in an area corresponding to an area where the pixel electrode is formed are aligned in a direction perpendicular to a longitudinal direction of the first domain dividers under the electric field in a plan view, and
wherein the liquid crystals in an area other than the area where the pixel electrode is formed and adjacent to the spacers are aligned in a direction perpendicular or parallel to the longitudinal direction in a plan view.

18. A liquid crystal display device comprising:
a first substrate having pixel areas, wherein each pixel area is divided into a plurality of domains;
a second substrate facing the first substrate;
liquid crystals aligned between the first and second substrates;
a pixel electrode formed in each pixel area on the first substrate;
a common electrode formed on the second substrate and forming an electric field with the pixel electrode to control an alignment of the liquid crystals;
domain dividers formed in the pixel and common electrodes to divide each pixel area into the plurality of domains; and
spacers formed between the first substrate and the second substrate in correspondence with the pixel areas to maintain a gap between the first and second substrates, at least one spacer being positioned apart from the pixel electrode and adjacent to a longitudinal end portion of at least one domain divider in each corresponding pixel area,
wherein the liquid crystals in an area corresponding to an area where the pixel electrode is formed are aligned in a direction perpendicular to a longitudinal direction of the first domain dividers under the electric field in a plan view, and
wherein the liquid crystals in an area other than the area where the pixel electrode is formed and adjacent to the spacers are aligned in a direction perpendicular or parallel to the longitudinal direction in a plan view.

* * * * *